United States Patent Office 2,981,894
Patented Apr. 25, 1961

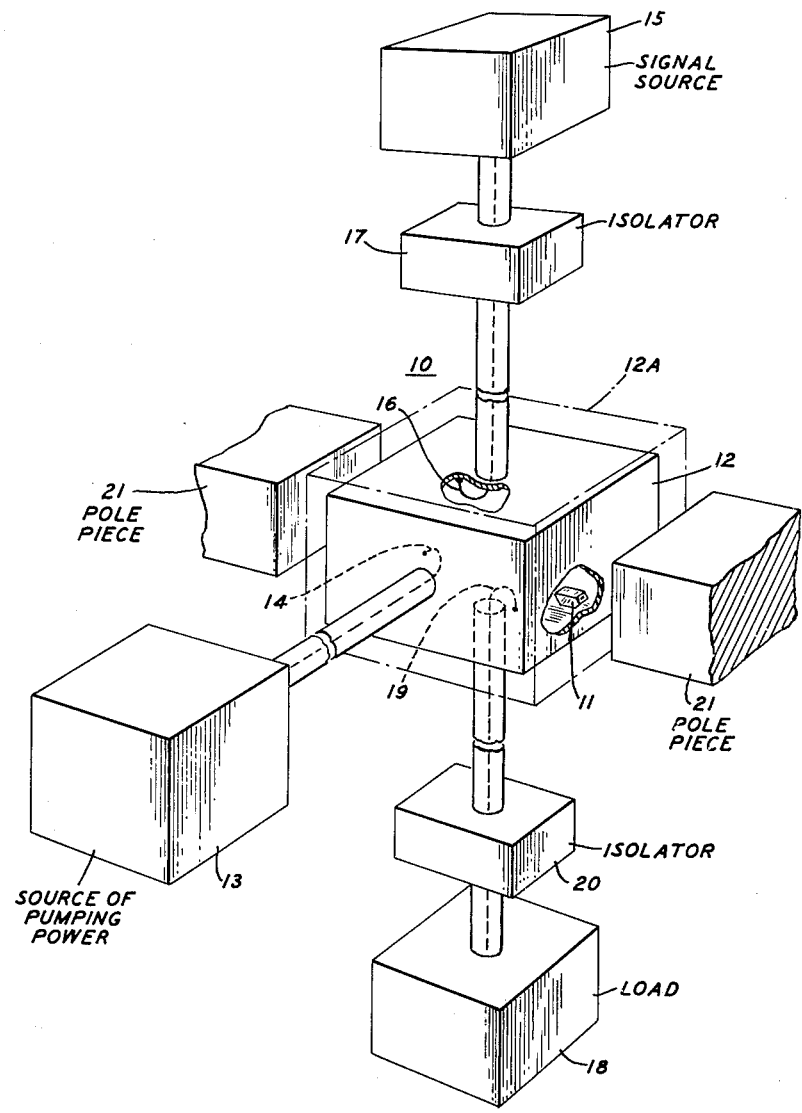

2,981,894
THREE LEVEL MASER

Henry E. D. Scovil, Morristown, N.J., assignor to Bell Telephone Laboratories, Incorporated, New York, N.Y., a corporation of New York Filed Nov. 30, 1956, Ser. No. 625,548

4 Claims. (Cl. 330—4)

This invention relates to amplification by stimulated emission of radiation. Apparatus for such amplification is now generally described as a maser.

It is characteristic of a maser that it employs a medium in which there is established at least intermittently a non-equilibrium population distribution in a pair of spaced energy levels of its energy level system. In particular, the population of the higher of the selected pair of energy levels of its energy level system is made larger than that of the lower. It is now usual to describe a medium which is in such a state of nonequilibrium as exhibiting a negative temperature with respect to two such levels. It is characteristic that if there be applied to a medium which is in a negative temperature state a signal of a frequency which satisfies Bohr's law with respect to the two energy levels which are in nonequilibrium $$\left(\nu = \frac{E_2 - E_1}{h}\right)$$

where $h$ is Planck's constant), then the applied signal will stimulate the emission of radiation at the signal frequency from the medium and the signal will be amplified.

Among the more promising forms of masers known is one which employs as the active material of the negative temperature medium an ionically bound crystalline paramagnetic salt whose energy level system is characterized by at least three spin energy levels with the separations of these three energy levels falling within suitable operating frequency ranges. To this crystal, there is supplied continuously pumping energy which effects transitions from the lowest to the highest of the selected three energy levels. By power saturation of the highest energy level whereby the populations of the highest and lowest energy levels are substantially equalized, there is established in one of these two energy levels a nonequilibrium population distribution with respect to the intermediate energy level of the selected three whereby a negative temperature results in the crystal. Thereafter, a signal of appropriate frequency can be amplified by being applied to the crystal. The principles of a maser of this kind are described in more detail in an article in The Physical Review, volume 104, No. 2, pages 324–327, entitled "Proposal for a New Type Solid State Maser," by N. Bloembergen.

In a three level maser of this kind, it is usually advantageous to have the relaxation time of transitions between the highest and lowest levels of the selected three levels (the pumping pair) as long as possible to minimize the amount of pumping power needed to maintain the medium in a negative temperature state. Similarly, it is desirable to have the relaxation time of the transitions between the intermediate level and the one of the highest and lowest levels with which it is in nonequilibrium (the active pair) be long to maximize the efficiency of the maser action. On the other hand, it is advantageous to have the relaxation time of transitions between the intermediate energy level and the remaining one of the highest and lowest levels (the idling pair) be considerably shorter than the relaxation time of transitions between the intermediate level and said one of the highest and lowest levels to maximize the efficiency of the maser action.

However, many paramagnetic salts of the kind useful as the active material in three level masers do not have optimum relaxation times for the transitions between the various energy levels. Moreover, in an individual paramagnetic salt, it ordinarily is not possible to decrease the relaxation time of the transitions between a given pair of levels without affecting in the same sense the relaxation times of transitions between other pairs of levels. As a consequence, it is not possible to adjust the relative relaxation times in an individual paramagnetic salt to achieve more nearly ideal conditions. As a result of the foregoing factors, limitations are imposed on the maximum efficiency which can be achieved in masers of the kind described.

The present invention is directed at removing these limitations. In particular, it is in accordance with the present invention to provide a maser which incorporates as the negative temperature medium a composite crystalline material which includes at least two paramagnetic salts chosen to have suitably related properties.

It has been characteristic hitherto to employ as the negative temperature medium a composite crystalline material which includes the active paramagnetic salt diluted in the lattice structure of an isomorphous diamagnetic salt. Such dilution has been useful to minimize the magnetic dipole-dipole interaction between neighboring paramagnetic ions by increasing the separation therebetween. Such interaction broadens the width of the energy levels and accordingly, must not be allowed to become excessive. The amount of pumping power needed for saturation is related directly to the widths of the energy levels, and accordingly, too wide energy levels increase undesirably the amount of pumping power necessary.

It will be characteristic of masers in accordance with the present invention to employ as the negative temperature medium a composite crystalline material including at least two paramagnetic salts, both preferably diluted in a diamagnetic salt. It will be convenient to describe as doping, to distinguish from diluting, the inclusion of the second paramagnetic salt. It is generally desirable to choose the various salts such that undue deformation of the lattice of the resulting composite crystal is avoided.

There are two effects of interest governing the magnetic dipole-dipole interaction which controls the relaxation mechanism in a paramagnetic salt. One arises from the fact that a given spin sees not only any applied magnetic field but also the magnetic field set up by the neighboring spins. Because these latter spins are oriented at random, the various spins in the crystal see different magnetic fields. It is this effect which is sought to be controlled by dilution of the paramagnetic salt in a diamagnetic salt. The second effect of interest is called dipolar or spin-spin resonance broadening. If we consider the spins in the classical gyroscopic model and picture them as precessing, then a given spin will see a radio frequency magnetic field from a precessing neighboring spin. If the neighbor is precessing at the same frequency as the given spin, then the radio frequency field will tend to induce transitions in the given spin. By this process spins may exchange energy among themselves and the relaxation times of transitions shortened. However, this second effect is dependent on the presence of neighboring spins having the same precessional frequency.

It is in accordance with the principles of the invention to employ this second effect selectively to reduce the relaxation time between transitions of a selected pair of spins of the three level paramagnetic salt active in the maser.

To this end, in a three level maser of the kind described there is utilized as the negative temperature medium a composite crystalline material which includes an active three level paramagnetic salt, a diamagnetic diluent, and additionally as a doping agent a paramagnetic salt having a pair of spin levels whose energy separation is substantially equal to the energy separation between the two levels of the active three level paramagnetic salt between which the relaxation time of transitions is desired to be shortened. In particular, it is desirable although not necessary that the characteristic relaxation time of the transitions between these two levels of the doping agent be itself shorter than the characteristic relaxation time of transitions between the corresponding two levels of the active paramagnetic salt. By such addition, the desired decrease in relaxation time of the transitions between two levels of the active paramagnetic salt is achieved by reason of the spin-spin interaction mechanism described above. It is also important that the doping agent not have any pair of spin levels whose separation substantially equals the separation of the two pairs of spin levels of the active paramagnetic salt between which the relaxation times of transitions are desirably long as previously described.

In an illustrative embodiment of the invention, the negative temperature medium comprises a composite crystal within whose lattice are included a lanthanum ethyl sulfate salt which acts as the diamagnetic diluent, the isomorphous gadolinium salt which acts as the active three level paramagnetic material, and the isomorphous cerium salt which acts as the two level doping agent. A steady magnetic field is applied to this composite crystal of magnitude and orientation relative to the crystal axis to achieve the desired relation between the energy separations of the spin levels of the gadolinium and cerium salts. There is further applied to the crystal pumping power of the frequency appropriate to achieving a negative temperature in the medium and energy of a frequency suited to amplification.

A concomitant advantage of use of a doped crystal is a relaxation in the degree of equalization of the populations of the highest and lowest energy levels of the active material necessary to achieve a negative temperature in the medium.

The invention will be better understood from the following more detailed description taken in conjunction with the accompanying drawing in which there is shown the basic structure of an illustrative form of three level maser suitable for utilizing the composite negative temperature medium characteristic of the present invention.

With reference now to the drawing, the solid 11 which is to serve as the negative temperature medium in accordance with the present invention is a composite crystal including a diamagnetic diluent, an active paramagnetic salt capable of having at least three discrete energy levels in its energy level system, and a doping paramagnetic salt capable of having in its energy level system at least two discrete energy levels whose separation can be substantially matched to the separation of a chosen pair of the three levels of the active paramagnetic salt. Typically, lanthanum ethyl sulphate is the diluent, the isomorphous gadolinium salt is the active paramagnetic salt, and the isomorphous cerium salt is the doping agent. This composite crystal is housed in a cavity resonator 12. The first of these modes is resonant at the frequency of the pumping power to be used to achieve saturation between the highest and lowest energy levels of the three selected levels of active paramagnetic salt in the composite crystal. The second of these modes is resonant at the center of the frequency band over which signal amplification is to be achieved. In the manner characteristic of a maser, the limits of this band are controlled by the separation of the two energy levels between which nonequilibrium is established by the pumping power. It is advantageous in the illustrative embodiment described that the field patterns of the two modes be orthogonal to one another for optimum efficiency.

It is also advantageous to keep the composite crystal at a low temperature, typically that of liquid helium. To this end, the cavity resonator advantageously is housed within suitable refrigerating apparatus shown schematically by the broken lines 12A.

Pumping power of appropriate frequency is supplied to the cavity resonator from a local oscillator 13 by way of a coupling loop 14 in the manner known to workers in the art for exciting the appropriate mode of the cavity resonator.

Input signal power is applied to the cavity resonator from a source 15 by way of a coupling loop 16. It is advantageous to include an isolator 17 in the signal path intermediate the input signal source and cavity resonator to minimize the transfer of power from the cavity resonator toward the source.

Output signal power is abstracted from the cavity resonator for utilization by the load 18, which in some instances may be another maser, by way of coupling loop 19. It is similarly advantageous to include an isolator 20 along the signal path intermediate the load and cavity resonator to minimize the reflection of power from the load back into the cavity resonator. Each of these two loops are arranged to couple to the cavity mode resonant at the signal frequency.

Alternatively, it is feasible to utilize only a single signal coupling loop to the cavity which leads to one arm of a circulator, other arms of which are connected to the signal source and the load, respectively, in a manner that will be evident to workers in the art. Similarly only a single signal output coupling loop is necessary if the maser is employed as an oscillator. In such operation, noise typically arising in the walls of the resonant cavity serves to stimulate the emission of radiation which gives rise to oscillations.

There is also positioned on opposite sides of the cavity resonator a pair of pole pieces 21 between which is established a steady magnetic field whose orientation relative to the crystalline axis of the composite medium is arranged to achieve the desired equality in the separation between a chosen pair of levels of the doping agent and the separation of the appropriate pair of levels of the active salt as described. The optimum orientation of this applied magnetic field relative to the magnetic field of the pumping power is dependent on the choice of active material. In this illustrative embodiment, the applied magnetic field is advantageously parallel to the magnetic field of the pumping power. In particular, if the effect of substantial equalization of the populations of the lowest level $E_1$ and the highest level $E_3$ of the selected three levels of the active paramagnetic salt is to establish a nonequilibrium state between the populations of the lowest level $E_1$ and the intermediate level $E_2$, the orientation of the steady magnetic field is adjusted to provide equality in the separation between energy levels $E_2$ and $E_3$ of the active paramagnetic salt and the separation of the two chosen levels of the doping paramagnetic salt. Conversely, if the nonequilibrium state is established between the populations of energy levels $E_2$ and $E_3$ of the active salt, the separation between its energy levels $E_1$ and $E_2$ would be arranged to be equal to the separation of two chosen levels of the doping paramagnetic salt.

In a composite crystal of the kind described which was further characterized by a composition which was approximately one half of one percent the active gadolinium salt, approximately one twentieth of one percent the cerium salt and the remainder the lanthanum salt, it was found that the desired relationship was achieved when the steady magnetic field was applied at an angle of about 73 degrees from the crystalline axis and with an intensity of about three thousand oersteds. The energy levels of the gadolinium salt affected corresponded to the (−5/2) (−3/2) transition. A negative temperature was established in such a crystal by supplying pumping power of a frequency of approximately 17.5 kilomegacycles. As a consequence, amplification at a frequency of approximately 9.0 kilomegacycles was made feasible.

Various considerations govern the choice of materials going into the composite crystal. With respect to the active material, it is important that its energy level system include at least three levels which can be suitably separated for operation in the desired frequency range. Moreover, it is also important that the transition probabilities and the spin lattice relaxation times be sufficiently high to make convenient power saturation between the highest and lowest levels of the three levels being used in operation. Various other ionically bound paramagnetic salts of the transition group, such as iron and rare earth groups, exhibit the desired properties. In particular, as is disclosed in the aforementioned Physical Review article, another material suitable as the active agent is nickel fluorosilicate.

With respect to the diluent, if employed, it is advantageous that it be isomorphous with the active material and also be diamagnetic so that it may passively serve to control the extent of magnetic dipole-dipole interaction and so the relaxation mechanism.

With respect to the doping agent, for use for the purposes described above, it is important that its energy level system both include two levels which can be suitably separated to match the separation of the appropriate two levels of the active material as has been described, and also fail to include under operating conditions two levels whose separation matches that of other possible pair of the three useful levels of the active material. This latter condition is readily insured by utilizing as the doping agent a material whose energy level system under operating conditions includes only two levels. Moreover, it is generally desirable to avoid undue deformation of the lattice of the composite crystal. In many instances, this is best assured by choice of the doping agent of a material which is isomorphous with the active material. However, in some instances particularly when the active paramagnetic salt is chosen from the iron transition group, it may be inconvenient to employ as the doping agent a paramagnetic salt which is isomorphous with the active material. In such instances, it is sufficient to use as the doping agent a non-isomorphous paramagnetic salt having the desired energy levels and which will fit into another lattice site of the composite crystal without undue deformation thereof. Moreover, as previously described, it is important that the spin lattice relaxation time of the transitions between the relevant two levels of the doping material also be shorter than that associated with the two appropriate levels of the active material. In general, ions with high anisotropies in the gyromagnetic splitting factor $g$ will have short spin lattice relaxation times. For example, of the paramagnetic ions of the rare earth group gadolinium has about the lowest anisotropy, and hence other ions of the rare earth group are suited for use as the doping agent in conjunction with the use of gadolinium as the active material. Moreover, of the paramagnetic ions of the iron group, the nickel ion has a relatively low anisotropy while cobalt ion has a relatively high anisotropy. Accordingly, such ions may be used as the doping agent in conjunction with the use of nickel ions as the active material.

In some instances, it may be advantageous to include in the composite crystal still another paramagnetic salt which acts to reduce the relaxation times of the transitions between all three of the energy levels of the active material in a non-selective fashion. This makes it feasible to realize higher output powers at the expense of the efficiency of the maser action and greater pumping power to establish a negative temperature in the composite crystal.

It is of course true that the doping technique described will be applicable to various other basic forms of masers in which it is desired to affect selectively the spin lattice relaxation time of the transitions between a chosen pair of energy levels.

It is accordingly to be understood that the specific embodiment described is merely illustrative of the general principles of the invention. Various other arrangements may be devised without departing from the spirit and scope of the invention.

In particular, in specific applications, it may be feasible to employ paramagnetic salts which have the desired separation of energy levels in the absence of an applied magnetic field. The use in a three level maser of an active paramagnetic salt which has desired separations of energy levels in the absence of an applied magnetic field is described in copending application Serial No. 623,648, filed November 21, 1956, by K. D. Bowers. The elimination of the need for an applied magnetic field makes feasible the use of a polycrystalline solid as the negative temperature medium.

What is claimed is:

1. In a maser, a composite crystal comprising an active paramagnetic salt whose energy level system is capable of at least three energy levels defining an active pair of levels, a pumping pair of levels and an idling pair of levels, and a doping paramagnetic salt whose energy level is capable of at least two discrete energy levels, means for matching the separation of a pair of levels of the doping paramagnetic salt substantially to the separation of the idling pair of levels of active paramagnetic salt while avoiding matching the separation of any pair of levels of the doping salt to the separations of the active and pumping pairs of levels of the active salt, said means comprising a magnetic field, means housing the crystal, means for applying pumping power to said housing means and for establishing a negative temperature between the active pair of levels of the active salt, and means for utilizing the negative temperature created.

2. The maser of claim 1 in which the composite crystal includes lanthanum ethyl sulphate, gadolinium ethyl sulphate, and cerium ethyl sulphate.

3. In a maser, a composite crystal comprising a diamagnetic diluent and an active paramagnetic salt whose energy level system is capable of at least three energy levels forming an active pair of levels, an idling pair of levels and a pumping pair of levels, means for reducing the relaxation time of the idling pair of levels preferentially over the relaxation times of the active pair of levels and the pumping pair of levels, said means comprising a doping paramagnetic salt in the crystal and a magnetic field for matching the separation of the idling pair of levels of the active salt to the separation of a pair of levels of the doping salt without matching the separations of the active and pumping pairs of levels to a pair of levels of the doping salt, means enclosing the crystal, means for supplying pumping power to the enclosing means for establishing a negative temperature between the active pair of levels of the active salt, and means for utilizing the negative temperature established.

4. The maser of claim 3 in which lanthanum ethyl sulphate is the diluent, gadolinium ethyl sulphate is the active salt, and cerium ethyl sulphate is the doping salt.

References Cited in the file of this patent

UNITED STATES PATENTS

| | | |
|---|---|---|
| 2,762,871 | Dicke | Sept. 11, 1956 |
| 2,802,944 | Norton | Aug. 13, 1957 |
| 2,825,765 | Marie | Mar. 4, 1958 |
| 2,836,722 | Dicke et al. | May 27, 1958 |
| 2,909,654 | Bloembergen | Oct. 20, 1959 |

OTHER REFERENCES

Wittke: "Proceedings of the IRE," March 1957, pages 291–316.

Translation of Article by Combrisson et al. in "Comptes Rendus," Proceedings of the French Academy of Sciences, May 14, 1956, 1st Semester, vol. 242, No. 20, pages 2451–2453 (Q–46–A–14).

Publication: Physical Review, vol. 99, No. 4, August 15, 1955, "The Maser—New Type of Microwave Amplifier, pages 1264–1274.

Publication: Physical Review, vol. 91, No. 5, Sept. 1, 1953, Electronic Structure of F Centers, pages 1066–1078.

Bloembergen: Physical Review, vol. 104, No. 2, Oct. 15, 1956, pages 324–327.

Scovil et al.: Physical Review, Jan. 15, 1957, pages 760–763.